United States Patent [19]

Cowan et al.

[11] 4,197,818

[45] Apr. 15, 1980

[54] PET WALKER

[76] Inventors: Jimmy Cowan, c/o George Spector, 3615 Woolworth Bldg., 233 Broadway; George Spector, 3615 Woolworth Bldg., 233 Broadway, both of, New York, N.Y. 10007

[21] Appl. No.: 854,583

[22] Filed: Nov. 25, 1977

[51] Int. Cl.² ............................................... A01K 3/00
[52] U.S. Cl. ...................................... 119/117; 119/121
[58] Field of Search ....................... 119/121, 124, 117; 40/607, 421, 424

[56] References Cited

U.S. PATENT DOCUMENTS

| 778,039 | 12/1904 | Holland | 119/124 |
| 2,502,807 | 4/1950 | Temmer | 119/121 |
| 2,525,890 | 10/1950 | Gage | 119/121 |

Primary Examiner—Hugh R. Chamblee

[57] ABSTRACT

A colorful stake to which a leash of a dog or other pet can be tethered so as not to run off; the stake including a metal prong for insertion into a ground, a flat plate freely pivotable around an above-ground portion of the prong, the plate being imprinted with a design of a person with a hand pictured around an actual ring formed on the plate and to which the leash is attached, the plate additionally having a space where the name of the pet or any other text can be written.

1 Claim, 4 Drawing Figures

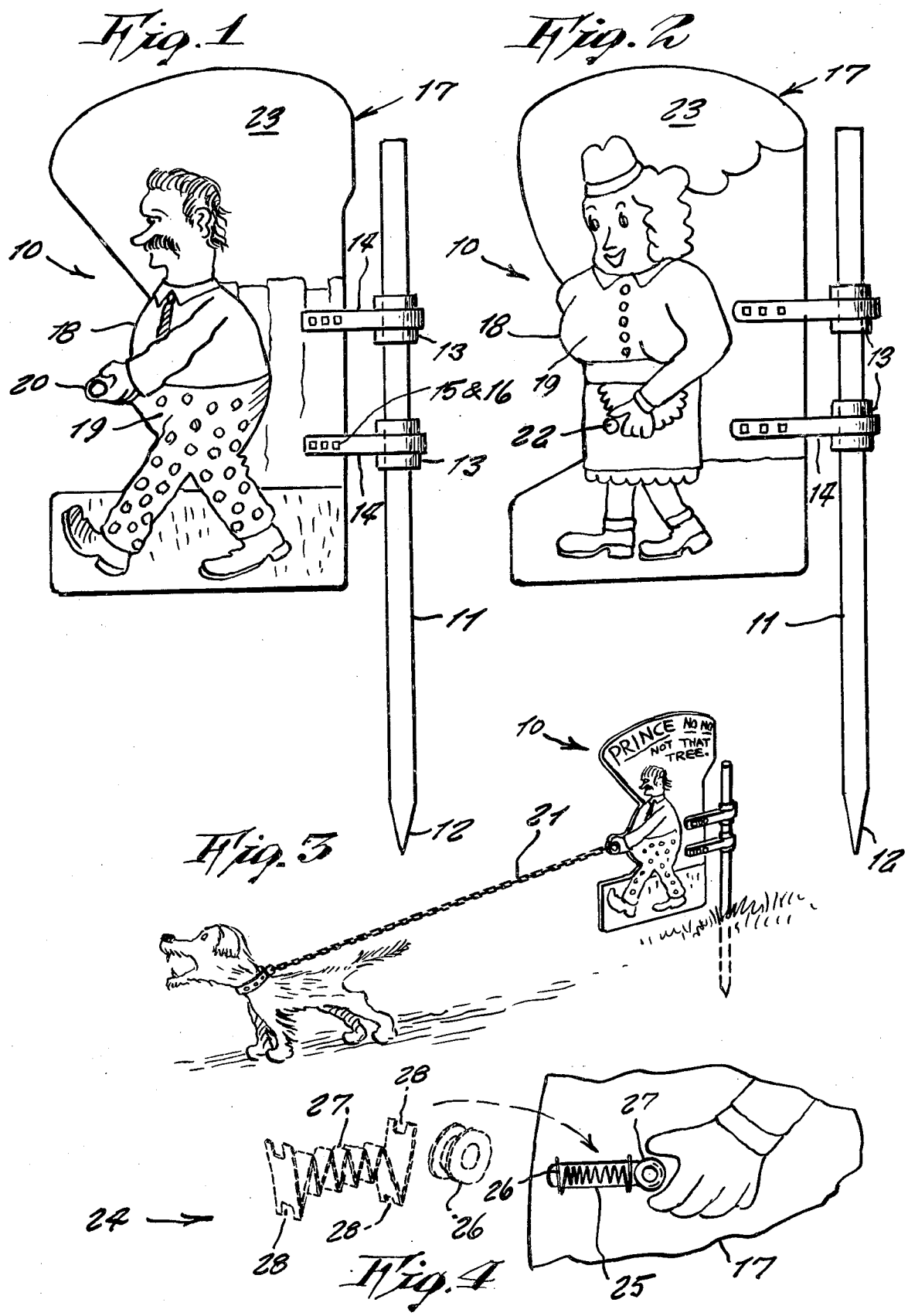

PET WALKER

This invention relates generally to pet accessories. More specifically it relates to a tethering stake.

A principal object of the present invention is to provide a stake insertable in a ground, and to which a household pet such as a dog or cat can be tethered when out-of-doors so to eliminate the need of a person to hold a leash with his hand while "walking" the animal.

Another object is to provide a pet walker which includes a freely pivotable sideward plate supported on the stake, an animal leash being tethered to the plate, so to eliminate the possibility of the leash getting all wound up around the stake by the animal running around.

Yet a further object is to provide a stake which is artistically attractive and appealing in apperance.

Yet a further object is to provide a pet walker which is readily portable so that it can be moved to a front or back yard or taken to set-up on a beach or out in a country or park.

Yet a further object is to provide a pet walker which is quick to install or remove to another area and which cannot be readily pulled out of a ground by the animal.

Other objects are to provide a pet walker which is simple in design, inexpensive to manufacture, rugged in construction, easy to use and efficient in operation.

These and other objects will be readily evident upon a study of the following specifications and the accompanying drawing wherein:

FIG. 1 is a side view of one design of the invention.

FIG. 2 is a side view of another design thereof.

FIG. 3 illustrates the invention in use securing a dog.

FIG. 4 is an enlarged detail of another design in which a compression spring absorbs an initial shock of a lunging dog so to prevent any pulling force striking hard against the stake and loosening it in the ground.

Refering now to the drawing in greater detail, and more particularly to FIGS. 1 to 3 thereof, the reference numeral 10 represents a pet walker according to the presnt invention wherein there is a three foot long metal rod or prong 11 for insertion into a ground, the lower end being accordingly tapered to a point 12. A pair of annularly grooved collars 13 are affixed six inches apart along an upper portion of the prong and metal straps 14 are looped so to pivotally travel in the annular grooves. The ends of straps are punched with several holes 15 so to receive bolts 16 extending through a flat sheet metal plate 17 having a contoured edge 18 and which on each opposite side thereof is imprinted with a design of a colorful or appealing caricature of a person 19. In FIG. 1, the Figure represents an imaginary Mr. Dee Butler, and in FIG. 2 represents an imaginary Nanny. Mr Dee Butler is shown with a hand thereof drawn around a ring 20 that is rigidly formed on the plate 17 so that one end of a tethering leash 21 can be attached thereto. The Nanny has a hole 22 made through the plate and her hand is drawn encircling the hole as it is to be holding a ring. The animal leash is attached to the hole.

In use, as shown in FIG. 3, the animal is thus prevented from running loose. A blank space 23 on the plate allows the animal owner to write therein the animal name, or else add any amusing phase, as shown, or else add any further pictoral illustration, as wished. In use, the plate swings in the direction that the animal pulls.

In FIG. 4, a modified design of pet walker 24 includes a horizontal slot 25 through the plate 17 and in which a grommet 26 flanged at each end is slidable against a compression spring 27 relained in the slot, so to absorb an initial shock of an animal pull against a leash. The spring is made of flat material having notches 28 at each end so to retain it in the slot.

While various changes may be made in the detail construction, it is understood that such changes will be within the spirit and scope of the present invention as in defined by the appended claims.

What is claimed is:

1. A pet walker, comprising in combination, a vertical prong tapered at its lower end to a point, a pair of spaced metal straps pivotally mounted on said prong, said straps being secured to a flat plate parallel to said prong, said plate being contoured and having a pictoral figure to depict a person holding an animal leash, and including a space for additional writing and drawing thereupon, said plate including a ring to which an animal leash may be tethered, said ring being so located relative to the depicted person to simulate a leash held by said person wherein said ring is movably mounted including means for resiliently resisting movement of said ring relative to said plate wherein said ring is mounted in a slot in said plate including flanges to retain said ring in said slot.

* * * * *